United States Patent [19]

Winzen

[11] Patent Number: 5,358,287
[45] Date of Patent: Oct. 25, 1994

[54] JOINTED PIPE CONNECTION

[75] Inventor: Wilfried Winzen, Pforzheim, Fed. Rep. of Germany

[73] Assignee: Witzenmann GmbH Metallschlauch-Fabrik Pforzheim, Pforzheim, Fed. Rep. of Germany

[21] Appl. No.: 85,326

[22] Filed: Jun. 30, 1993

[30] Foreign Application Priority Data

Jul. 27, 1992 [DE] Fed. Rep. of Germany ....... 4224745

[51] Int. Cl.$^5$ .............................................. F16L 27/00
[52] U.S. Cl. ..................................... 285/227; 285/300; 285/163
[58] Field of Search ................. 285/49, 163, 164, 226, 285/227, 228, 299, 300

[56] References Cited

U.S. PATENT DOCUMENTS

| 2,451,252 | 10/1948 | Stoeckly | 285/299 |
|---|---|---|---|
| 2,712,456 | 7/1955 | McCreery | 285/299 |
| 3,652,108 | 3/1972 | Coats | 285/165 |
| 4,659,117 | 4/1987 | Holzhausen et al. | 285/299 |
| 4,875,716 | 10/1989 | Winzen et al. | |
| 4,893,847 | 1/1990 | Hess | 285/226 |
| 4,911,482 | 3/1990 | Doat | 285/226 |
| 5,069,487 | 12/1991 | Sheppard | 285/226 |
| 5,090,746 | 2/1992 | Holzhausen | 285/226 |
| 5,145,215 | 9/1992 | Udell | 285/300 |

FOREIGN PATENT DOCUMENTS

| 0208128 | 1/1987 | European Pat. Off. | |
|---|---|---|---|
| 0398086 | 11/1990 | European Pat. Off. | |
| 3524931 | 2/1986 | Fed. Rep. of Germany | |
| 571022 | 8/1945 | United Kingdom | 285/227 |

Primary Examiner—Eric K. Nicholson
Attorney, Agent, or Firm—Frishauf, Holtz, Goodman & Woodward

[57] ABSTRACT

Jointed pipe connections are used for axial, angular and lateral oscillation decoupling of tubular pipe segments. A jointed pipe provided for connection with a first pipe segment has an annular fold, against which a pressed wire ring rests respectively on the right and left sides. The pressed wire rings are enclosed by an annular cuff which, by means of a pipe socket, forms a cuff pipe used for a connection with a second pipe segment. This prior art arrangement permits only a limited annular movement. The permitted pivot angle diminishes as pipe diameter increases. In accordance with the invention, a plurality of joint areas are provided. The jointed pipe (3) located on the inside has annular folds (4) at both ends. Annular pads (5) rest against these and are enclosed in pairs by annular cuffs (6). The cuffs (6) have pipe sockets (6a) by means of which they are connected with the pipe segments. The cuffs (6) are connected in a gas-tight manner by a sealing bellows (9, 29).

13 Claims, 3 Drawing Sheets

JOINTED PIPE CONNECTION

Cross-reference to related patents and applications, assigned to the assignee of the present invention, U.S. Pat. No. 4,875,716, WINZEN & WUNSCHMANN, granted Oct. 24, 1989; German application DE 35 24 931 A1, publ. Feb. 20, 1986; and corresponding European Patent 0 208 128 B1, publ. Jan. 14, 1987. German patent application P 42 20 789.4, filed June 1992 and published Jan. 5, 1994.

FIELD OF THE INVENTION

The invention relates to a jointed pipe connection for the decoupling of axial angular and lateral oscillations of two pipe segments, which are at least indirectly connected with each other in a gas-tight manner, having a pipe link disposed in the interior, on which annular pads are supported which define, together with a cuff extending over the exterior in an interlocking manner and connected with the adjoining pipe segment, a joint area, and having a sealing bellows which is in a close connection with the other pipe segment.

BACKGROUND

A jointed pipe connection is known from European Patent 0 203 128 B1 and U.S. Pat. No. 4,875,716, WINZEN et al. This embodiment permits a limited axial, angular and lateral movement, of the pipe segments connected with the joint, with respect to each other. The axial mobility is limited by the elasticity of the annular pads. Because of the interlock then being provided between the interior jointed pipe and the cuff, this arrangement is particularly suited as an interlocking connection member between the engine and the exhaust system, particularly in motor vehicles. In addition to its function as a bearing component, it can also transmit the inertia forces generated during acceleration and during braking.

The known embodiment of a jointed pipe connection permits only limited angular movement. This may be sufficient for pipe conduits up to a certain diameter. As diameter increases, the permitted pivot angle becomes progressively smaller.

THE INVENTION

It is therefore the object of the invention to provide a pipe joint which assures the desired mobility, particularly with larger diameters, while maintaining the interlocking connection.

The advantages realized by the invention lie in particular in the enlargement of the angular movement play using two or more joint areas, without having to make do without the interlock.

The invention will be described in detail below by means of two exemplary embodiments in connection with the drawings.

DRAWINGS

DETAILED DESCRIPTION

Figure 1:
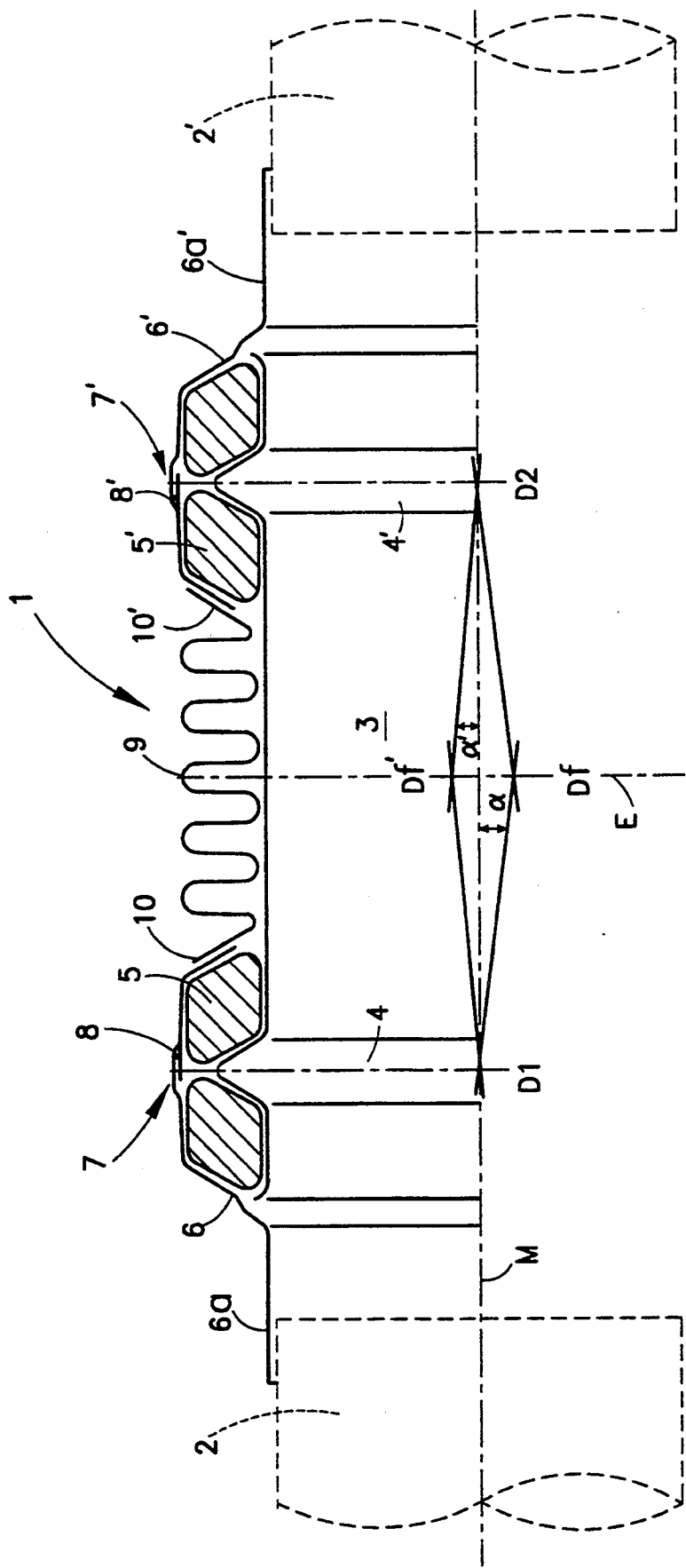
FIG. 1 shows a first exemplary embodiment of a jointed pipe connection in accordance with the invention in a principal view and in longitudinal section.

FIG. 1 shows a first exemplary embodiment of a jointed pipe connection 1 in a principal view and in longitudinal section. The sectional view is limited to the upper half of the jointed pipe connection 1, because this is sufficient for understanding the subject of the invention. The jointed pipe connection 1 connects two pipe segments 2 shown by dashed lines. An interior pipe link 3 is provided as the bearing element. The pipe link 3 has an annular fold 4 at each of its ends, the distance of which from the pipe end equals the axial dimension of the annular pads 5. Annular pads 5 rest against the flanks of the folds 4 and are interlockingly enclosed by annular cuffs 6. In accordance with the older German Patent Application P 42 20 789.4, published on Jan. 5, 1994 as DE-OS 42 20 789, the cuffs are made in two parts which extend over each other in an overlapping area 7. The two parts of the cuff 6 are pressed together in the axial direction with a force corresponding to the required clamping of the annular pads 5 and are subsequently welded together at a weld bead 8.

Each cuff 6 has a pipe socket 6a. In the installed state of the jointed pipe connection 1, the pipe sockets 6a extend over the pipe segments 2 and are connected with them in a gas-tight manner. A sealing bellows 9 is provided between the two joint areas and is connected in a gas-tight manner, for example by welding, with the cuffs 6 in the area 10. It prevents gasses exiting through the preferably porous annular pads 5 from reaching the outside.

The above-described jointed pipe connection 1 has two pivot ranges and thus two real pivot points D1 and D2, located on the central axis M. An imaginary or effective pivot point Df/Df' results from what was stated before, which moves in the range of the maximum pivot angle alpha/alpha' on a plane E perpendicular to the central axis M. Plane E extends through the center of the sealing bellows 9. In this way, it is assured that both halves of the bellows participate optimally in the movement and that therefore the longest service life is achieved.

Figure 2:
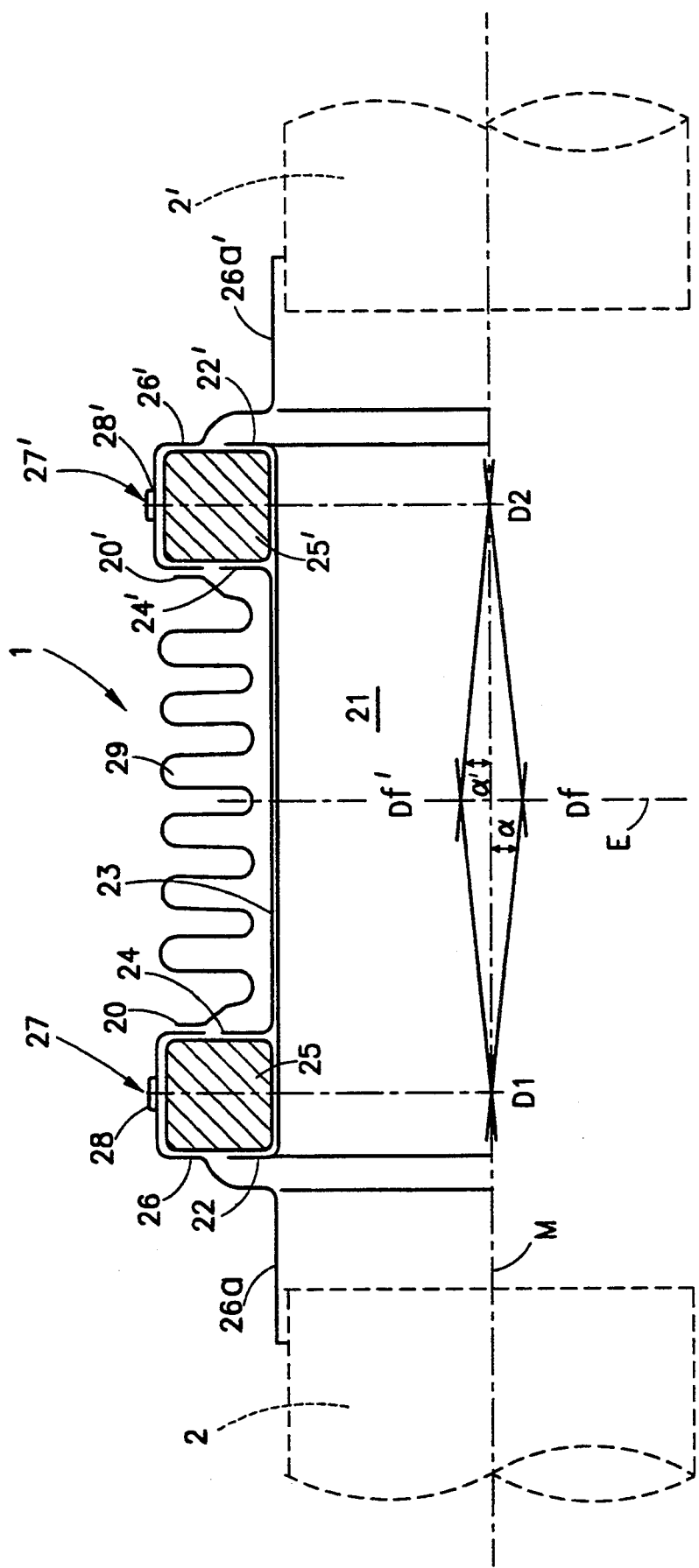
FIG. 2 shows a second exemplary embodiment of a jointed pipe connection in accordance with the invention in a principal view and in longitudinal section.

FIG. 2 shows a second exemplary embodiment of a jointed pipe connection 1 in a principal view and in longitudinal section. Here, too, the illustration is limited to the upper half of the jointed pipe connection 1 for the previously mentioned reasons. The view shows the jointed pipe connection 1 mounted between two pipe segments 2, indicated by dashed lines. Here, too, an inner jointed pipe 21 is provided as the bearing element. The ends of the pipe link 21 are crimped to provide flanges 22. A shorter intermediate pipe 23 is located on the pipe link 21, the ends of which are also disposed as flanges 24. The distance between the flanges 22 and 24 is barely the width of annular pads 25, so that these are firmly held between the flanges 22 and 24 in the assembled state. The flanges 22 and 24 have a diameter extending approximately as far as the center of the annular pads 25.

On the outside, the annular pads are enclosed approximately as far as the center by annular cuffs 26 consisting of two parts, as in the previous example, which overlap in the area 27. In accordance with the older German patent application P 42 20 789.4, assigned to Witzenmann GmbH, the annular cuffs are axially compressed to cause pre-stressing in the annular pads 25, and are subsequently connected with each other by welding (welding bead 28). The cuffs 26 do not hermetically seal the area of the annular pads. Thus, gases can reach the outside through the generally porous material of the annular pads 25. This is prevented by a sealing bellows 29, which is disposed between the two joint areas and is connected in a gas-tight manner with the cuffs 26 in the areas 20. The cuffs 26 have pipe sockets 26a which, in the installed state of the jointed pipe connection 1, extend over pipe segments 2, and are connected with them in a gas-tight manner.

The same as in the first example in accordance with FIG. 1, the above-described jointed pipe connection 1 has two pivot ranges and thus two real pivot points D1 and D2, located on the central axis M. An imaginary pivot point Df/Df' results from what was stated before, which moves in the range of the maximum pivot angle alpha/alpha' on a plane E crosswise to the central or middle axis M. The plane E extends through the center of the sealing bellows 9. In this way, it is assured that both halves of the bellows participate optimally in the movement, and that therefore the longest service life is achieved.

Figure 3A:
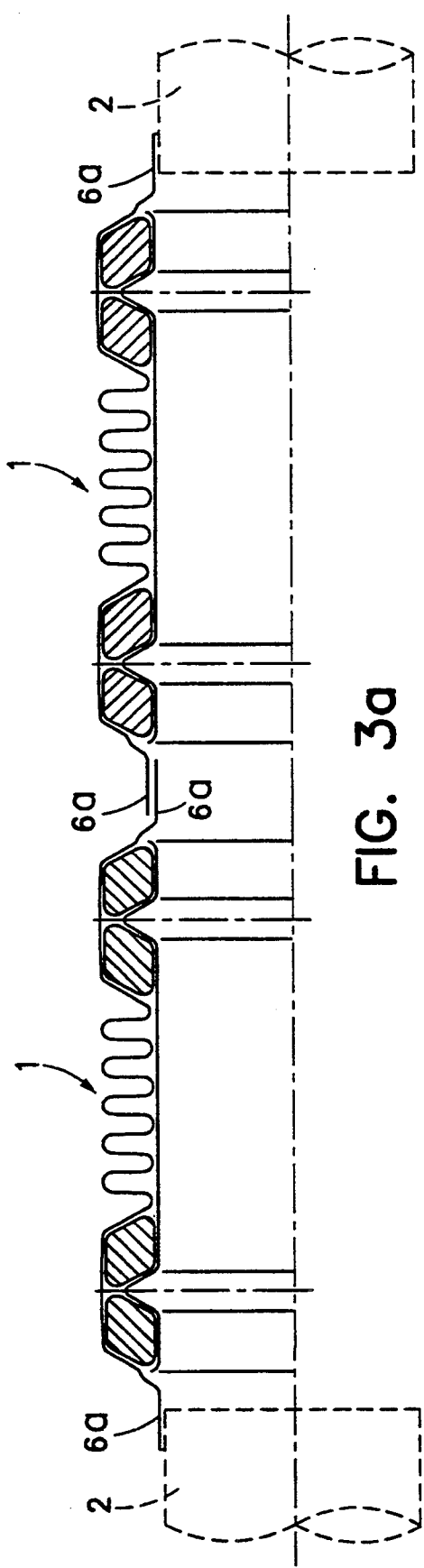
FIGS. 3a and 3b illustrate multi-jointed embodiments of a jointed pipe connection in accordance with FIG. 1 or FIG. 2, in a principal view.
Figure 3B:
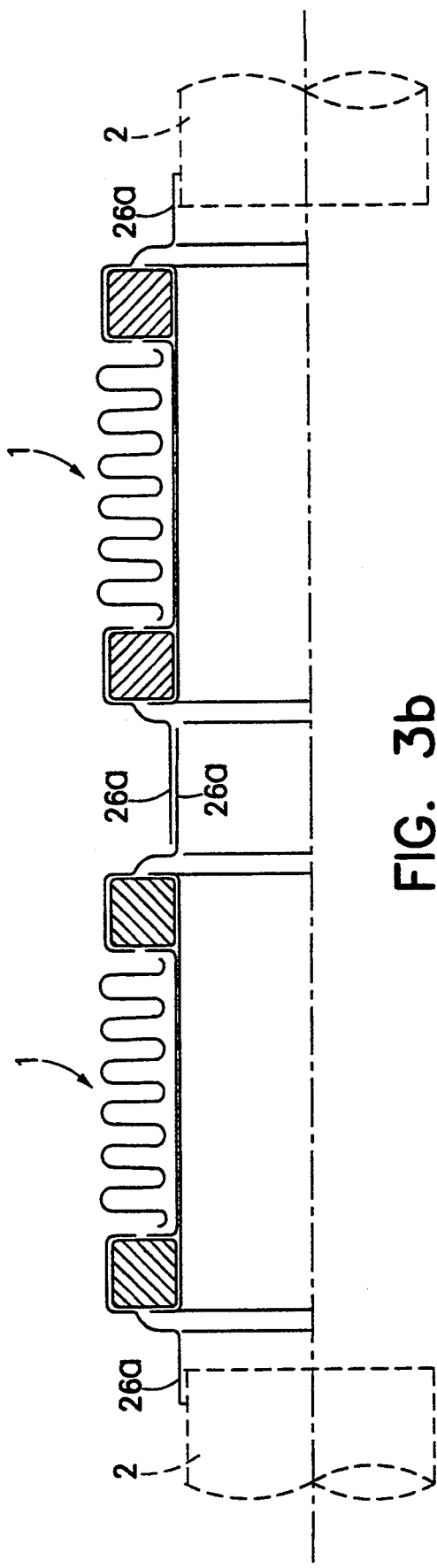

FIGS. 3a and 3b show two jointed pipe connections with fourfold joint areas in a principal view. FIG. 3a shows two jointed pipe connections 1 in accordance with FIG. 1, the inner pipe sockets 6a of which are formed in such a way that they fit inside each other. They form a rigid, gas-tight connection. This joint unit installed between pipe segments 2 is an interlocking connecting member with twofold angular mobility.

FIG. 3b shows a joint unit consisting of two jointed pipe connections 1 in accordance with FIG. 2. Here, too, the two parts form an interlocking connecting member because of a rigid connection via the inner pipe sockets 26a, which also assures a twofold angular mobility.

The annular pads 5 and 25 are preferably made of heat-resistant ceramic or metal filaments which are pressed to form elastic rings. A particularly suitable embodiment of the annular pads 5 and 25 are pressed wire rings made of plaited wire. Manufacture of the jointed pipe connections can be simplified if the annular pads 5 and 25 are formed as half rings.

Various changes and modifications may be made, and features described in connection with any one of the embodiments may be used with any of the others, within the scope of the inventive concept.

What is claimed is:

1. A jointed pipe connection for interconnecting a first pipe segment (2) and a second pipe segment (2') in a gas-tight manner, while permitting limited axial, angular, and lateral oscillations of the two pipe segments (2,2') with respect to each other,
    comprising
    a pipe link (3, 21) located axially between said pipe segments and having first and second ends located respectively adjacent said first and second pipe segments (2,2');
    at least a first annular pad (5, 25) of elastic, heat-resistant material, mounted circumferentially around said first end of said pipe link (3,21);
    a first cuff (6) secured to said first pipe segment extending axially over said first annular pad (5,25); and
    a sealing bellows (9, 29) radially outside and surrounding said pipe link (3, 21) and having a first end secured in a gas-tight manner (8) to said first cuff (6);
    said pipe link first end, said first annular pad, and said sealing bellows first end collectively defining a first joint having a first pivot point (D1);
    at least a second annular pad (5', 25') of elastic, heat-resistant material, mounted circumferentially around said second end of said pipe link (3, 21);
    a second cuff (6') secured to said second pipe segment (2') and extending axially over said second annular pad (5', 25');
    said sealing bellows (9, 29) having a second end secured in a gas-tight manner (8') to said second cuff (6');
    said pipe link second end, said second annular said sealing bellows second end collectively defining a second joint having a second pivot point (D2).

2. A jointed pipe connection in accordance with claim 1,
    wherein
    the pipe link (3) is provided, at each of said first and second ends thereof, with means (4,4') for axially supporting the annular pads.

3. A jointed pipe connection in accordance with claim 1,
    wherein
    the cuffs (6, 26) enclosing the annular pads (5, 25) are connected with each other by said sealing bellows (9, 29), and the cuffs (6, 26) have a pipe socket (6a, 26a) on an outside portion of said pipe connection, for connection to the pipe segments (2,2').

4. A jointed pipe connection in accordance with claim 2,
    wherein
    the means for support are annular folds (4), each having two sides, against both sides of which rest annular pads (5).

5. A jointed pipe connection in accordance with claim 2,
    wherein
    the means for support are annular flanges, between which annular pads (25,25') are held.

6. A jointed pipe connection in accordance with claim 5,
    further comprising an intermediate pipe (23) located radially between said pipe link (21) and said sealing bellows (29), and
    wherein
    axially inner ones (24) of said annular flanges are crimped-up ends of said intermediate pipe (23).

7. A jointed pipe connection in accordance with claim 1,
    characterized in that
    a plurality of jointed pipe connections (1) with two joint areas (7) are rigidly connected with each other.

8. A jointed pipe connection in accordance with claim 7,
    characterized in that
    the jointed pipe connections (1) are rigidly connected with each other by interconnection of pipe sockets (6a, 26a) of the cuffs (6, 26).

9. A jointed pipe connection in accordance with claim 1,
    characterized in that the annular pads (5, 25) are made of pressed filaments of ceramic.

10. A jointed pipe connection in accordance with claim 1,
    characterized in that the annular pads (5, 25) are made of pressed filaments of metal.

11. A jointed pipe connection in accordance with claim 1,
wherein
the pipe link (21) is formed, at each of said first and second ends thereof, with annular flanges (22, 24; 22', 24') for axially supporting the annular pads, and each annular pad (25, 25') is axially sandwiched between two of said flanges.

12. A jointed pipe connection in accordance with claim 1,
wherein
said pipe link (3, 21) has a middle or central axis (M); said first and second pivot points (D1, D2) fall on said axis; and
pivoting said first and second pipe segments (2, 2') with respect to each other creates an effective pivot point (Df) which, depending upon the angle between said segments (2, 2'), moves along a plane (E) perpendicular to said pipe link axis (M).

13. A jointed pipe connection in accordance with claim 12,
wherein
said plane (E) of said effective pivot point (Df) coincides with the axial midpoint of said sealing bellows (9, 29).

* * * * *